W. F. KRICHBAUM.
AUTOMATIC STOP VALVE.
APPLICATION FILED MAR. 25, 1914.

1,119,287.  Patented Dec. 1, 1914.

WITNESSES:
Howard P. King
Mildred E. Brooks

INVENTOR:
William F. Krichbaum
By Russell M. Everett
ATTORNEY.

UNITED STATES PATENT OFFICE.

WILLIAM F. KRICHBAUM, OF NEWARK, NEW JERSEY, ASSIGNOR TO FOSTER ENGINEERING COMPANY, A CORPORATION OF NEW JERSEY.

AUTOMATIC STOP-VALVE.

1,119,287.  Specification of Letters Patent.  Patented Dec. 1, 1914.

Application filed March 25, 1914. Serial No. 827,026.

*To all whom it may concern:*

Be it known that I, WILLIAM F. KRICHBAUM, a citizen of the United States, residing at Newark, in the county of Essex and State of New Jersey, have invented certain Improvements in Automatic Stop-Valves, of which the following is a specification.

This invention relates more especially to that class of valves which are employed in connection with pipe systems supplying fluid under pressure for the purpose of automatically shutting off the supply of fluid in case of a break or excess flow or the like such as reduces the pressure at any point beyond the valve. For instance, such a valve may be employed in connection with fuel oil systems by which oil is burned to generate power as on shipboard or elsewhere; in connection with pipe systems for supplying gas in any place where the pipes are liable to breakage and the gas is explosive or otherwise dangerous when escaping, and in many other cases.

The objects of the invention are to secure such a valve of simple construction which can be readily inserted in any pipe line; to secure automatic action by a single moving part; to insure prompt closing of the valve as soon as pressure beyond it falls; to insure that the valve will normally remain closed until the pressure equalizes on both sides of it; to provide means for manually opening the valve when desired to so equalize the pressure; to guard against wrong assembling of the valve parts and improper operation of it through inadvertence or ignorance; to secure durability and avoid liability to get out of order, and to obtain other advantages and results as may be brought out in the following description.

Figure 3:
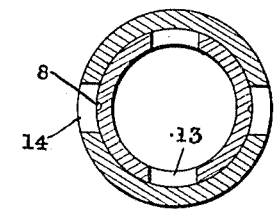
Figure 1:
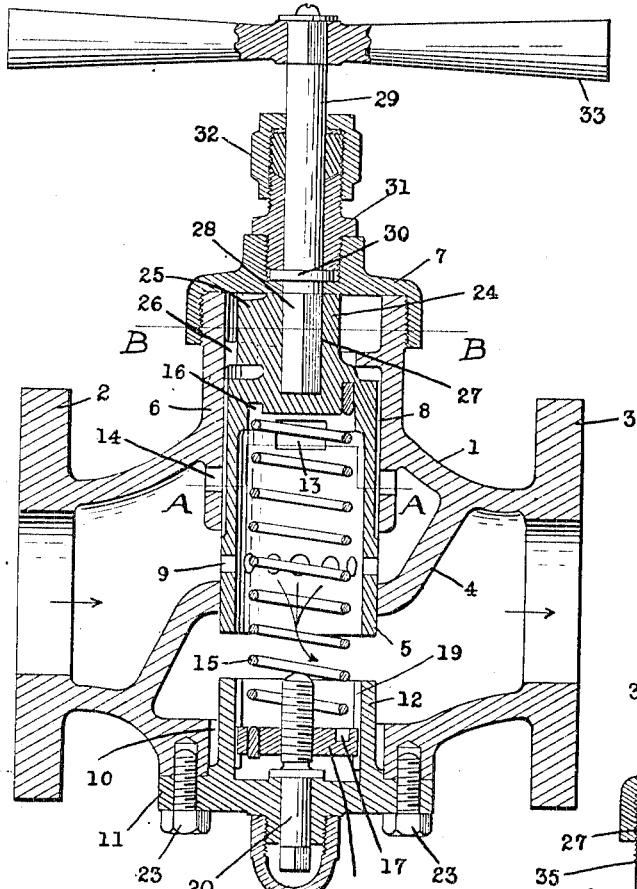
Figure 2:
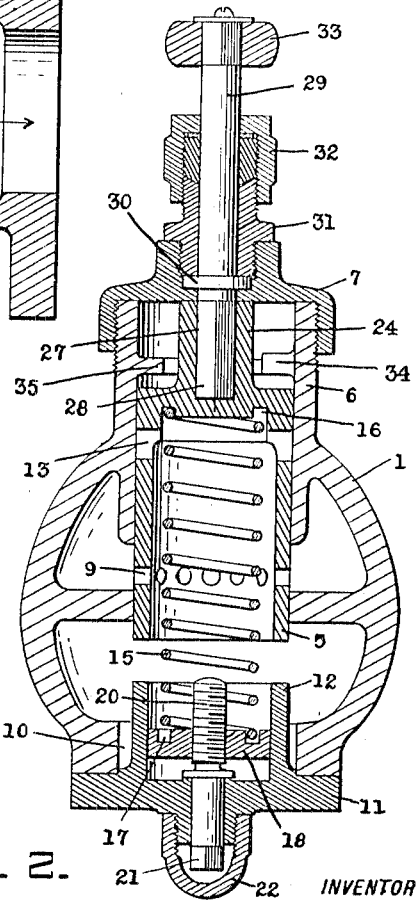
Figure 4:
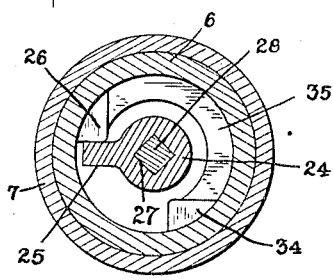

Referring to the accompanying drawings in which like numerals of reference indicate the same parts throughout the several views, Figure 1 is a vertical longitudinal section of my improved stop valve, taken centrally thereof with the parts in position to allow flow through the valve; Fig. 2 is a transverse section of the same; Fig. 3 is a detail section on line A—A of Fig. 1, and Fig. 4 is a detail section on line B—B of Fig. 1.

In the specific embodiment of the invention illustrated in said drawing, 1 indicates the body portion of the valve provided at its opposite ends with flanges 2, 3 by means of which the valve can be inserted between the ends of two pipe sections and connected thereto in alinement with them. Within said body portion there is a transverse partition 4 through which slides a hollow plunger 5 mounted in a slideway formed by a neck or extension 6 at one side of the body 1 and closed by an outer cap 7. The plunger 5 is closed at its upper end, and has in its outer wall grooves 8 which extend from a point below the slideway clear to the upper end of the plunger, thus enabling the pressure of a fluid entering at the end 2 of the valve to act upon the top of the plunger and tend to force it downward. If there is not an equal pressure at the discharge end of the valve to resist this downward movement of the plunger, as would be the case if a break had occurred, the plunger will be lowered from its position shown in the drawing and the flow passages 9 through its wall will be covered and sealed by the partition 4. Obviously there can then be no flow through the valve, and the supply of fluid is thus automatically stopped.

At the side of the valve body diametrically opposite the neck or extension 6 is an aperture 10 to which is applied from the outside a plate 11 having at its inner side an annular flange 12 which projects through the aperture 10 into the chamber of the valve body and is adapted to engage the end of the plunger 5 as a stop to limit its downward or closing movement. Upward movement of the plunger 5 is similarly stopped or limited by engagement of it at its top with the cap 7 before described.

In order to reset the valve or its plunger 5 in position to again automatically act after it has once closed, the plunger 5 is provided at an upper point of its lower tubular portion with port openings 13, which, when the plunger is depressed or in closed position, are adapted upon giving the plunger a quarter turn to register with corresponding ports 14 in the sides of the lower portion of the plunger slideway which projects into the inlet portion of the valve chamber. When such a quarter turn is given the plunger, therefore, the fluid again flows through the valve, by way of the ports 14, 13 and when it has equalized the pressure on the delivery side of the valve, so that it is alike both above and below the plunger 5 said plunger is forced upward into its original position by means of a spring 15. This spring 15 extends through the hollow portion of the plunger 5, being seated at its upper end in a groove 16 in the closed end of the plunger, and at its lower end the said spring 15 is seated in a groove 17 of a follower 18 adapted to slide up and down in the annular flange 12 upon lateral ribs 19, adjustment of said follower to vary the tension of the spring being secured by a screw 20 extending through it and having a reduced head 21 extending out through the plate 11 to receive a wrench. Preferably a cap 22 covers the wrench-receiving head, as shown.

In order to insure that the valve must be positively opened after it has once automatically closed, I prefer to have the spring 15 exert a torsional strain upon the plunger 5 to hold its ports 13 out of registration with the ports 14, which can obviously be done by removing the cap screws 23 or other equivalent fastening of the plate 11 and turning said plate as desired before again securing it in place. Furthermore, to stop the plunger 5 from such rotary motion with its ports 13 properly out of registration with its ports 14 in the slideway, I form upon the side of the reduced upper end 24 of the plunger 5 a radial wing 25 preferably projecting in an axial plane and adapted to engage a stop 26 projecting from the side wall of the slideway. Normally, therefore, the spring 15 holds said wing 25 against said stop 26, as well as tending to elevate or open the plunger 5.

For turning the plunger 5 against the power of the spring 15 to bring its ports 13 into registration with the ports 14, the reduced end 24 of the plunger is preferably provided with an axial socket 27 adapted to receive the end 28 of a turning post 29 projecting out through the cap 7, said end 24 and its socket being formed so as to cause the post and plunger to turn together and yet allow the plunger to slide on said end. Said post 29 has an exterior flange 30 seated in a recess in the top of the cap 7 and held by a nut 31 screwed down into said recess against the said flange, and preferably a stuffing box 32 is carried upon the top of said nut around the post 29. The outer end of the post is formed in any suitable manner for turning or for receiving a handle to turn it, such as the cross bar 33 which I have shown in the drawing. By this cross bar 33, the plunger can be readily turned to open the valve after a break in the delivery pipe has been repaired, and it will be understood that the plunger must be held by such handle in the open position to which it is turned until the pressure of the fluid equalizes on both sides of the valve. Then the plunger rises to its open position and the handle can be released. In order to insure turning of the plunger 5 to exactly the right extent, a second stop 34 is formed upon the inner wall of the slideway to be engaged by the wing 25 when the ports 13, 14 are in registration. Furthermore, in order to insure that the plunger 5 shall not be inserted in wrong position in its slideway, in assembling the valve, the two stops 26 and 34 are preferably connected by a web 35 extending between them on that side of the slideway where the wing 25 should not lie and which serves to prevent the plunger 5 entering the slideway with said wing in other than right position.

Having thus described the invention what I claim is.

1. A stop valve comprising in combination a body portion with an apertured partition and a slideway at the inlet side of said partition in alinement with the aperture thereof and having lateral ports, a hollow plunger in said slideway having flow passages adapted to be sealed by the partition and ports normally out of radial alinement with the slideway ports and adapted to be in the same transverse plane therewith when the flow passages are sealed, one of said parts having ducts adapted to communicate pressure from the inlet end of the valve to the outer end of said plunger, stops limiting longitudinal movement of the plunger, and a spring normally holding said plunger with its flow passages open.

2. A stop valve comprising in combination a body portion with an apertured partition and a slideway at the inlet side of said partition in alinement with the aperture thereof and having lateral ports, a hollow plunger in said slideway having flow passages adapted to be sealed by the partition and ports normally out of radial alinement with the slideway ports and adapted to be in the same transverse plane therewith when the flow passages are sealed, said plunger having exterior longitudinal grooves adapted to communicate pressure from the inlet end of the valve to the outer end of said plunger, stops limiting longitudinal movement of the plunger, and a spring normally holding said plunger with its flow passages open.

3. A stop valve comprising in combination a body portion with an apertured partition and a slideway at the inlet side of said partition in alinement with the aperture thereof and having lateral ports, a hollow plunger in said slideway having flow passages adapted to be sealed by the partition and ports normally out of radial alinement with the slideway ports and adapted to be in the same transverse plane therewith when the flow passages are sealed, one of said parts having ducts adapted to communicate pressure from the inlet end of the valve to the outer end of said plunger, stops limiting longitudinal movement of the plunger, and a spring acting longitudinally to hold said plunger with its flow passages open and acting torsionally to hold its ports out of radial alinement with the ports in the slideway.

4. A stop valve comprising in combination a body portion with an apertured partition and a slideway at the inlet side of said partition in alinement with the aperture thereof and having lateral ports, a hollow plunger in said slideway having flow passages adapted to be sealed by the partition and ports normally out of radial alinement with the slideway ports and adapted to be in the same transverse plane therewith when the flow passages are sealed, one of said parts having ducts adapted to communicate pressure from the inlet end of the valve to the outer end of said plunger, stops limiting longitudinal movement of the plunger, and a spring in said hollow plunger between the upper closed end thereof and the opposite side of the valve body arranged and adapted to hold the plunger with its flow passages open by longitudinal tension and to hold the ports of the plunger out of radial alinement with the ports of the slideway by torsional tension.

5. A stop valve comprising in combination a body portion with an apertured partition and a slideway at the inlet side of said partition in alinement with the aperture thereof and having lateral ports, a hollow plunger in said slideway having flow passages adapted to be sealed by the partition and ports normally out of radial alinement with the slideway ports and adapted to be in the same transverse plane therewith when the flow passages are sealed, one of said parts having ducts adapted to communicate pressure from the inlet end of the valve to the outer end of said plunger, stops limiting longitudinal movement of the plunger, a spring acting longitudinally to hold said plunger with its flow passages open and acting torsionally to hold its ports out of radial alinement with the ports in the slideway, and means for turning said plunger, said means permitting longitudinal movement of the plunger.

6. A stop valve comprising in combination a body portion with an apertured partition and a slideway at the inlet side of said partition in alinement with the aperture thereof and having lateral ports, a hollow plunger in said slideway having flow passages adapted to be sealed by the partition and ports normally out of radial alinement with the slideway ports and adapted to be in the same transverse plane therewith when the flow passages are sealed, one of said parts having ducts adapted to communicate pressure from the inlet end of the valve to the outer end of said plunger, stops limiting longitudinal movement of the plunger, a spring acting longitudinally to hold said plunger with its flow passages open and acting torsionally to hold its ports out of radial alinement with the ports in the slideway, and a handle having an angular end slidably entering a correspondingly shaped longitudinal socket in the closed end of the plunger.

7. In a stop valve, the combination of a body portion with an apertured partition and a slideway at the inlet side of said partition in alinement with the aperture thereof and having lateral ports, a hollow plunger in said slideway having flow passages adapted to be sealed by the partition and ports normally out of radial alinement with the slideway ports and adapted to be in the same transverse plane therewith when the flow passages are sealed, one of said parts having ducts adapted to communicate pressure from the inlet end of the valve to the outer end of said plunger, a plate adjustably secured to the valve body on the outlet side of the partition in alinement with the slideway and providing an interior stop for the plunger, and a spring normally holding said plunger with its flow passages open.

8. In a stop valve, the combination of a body portion with an apertured partition and a slideway at the inlet side of said partition in alinement with the aperture thereof and having lateral ports, a hollow plunger in said slideway having flow passages adapted to be sealed by the partition and ports normally out of radial alinement with the slideway ports and adapted to be in the same transverse plane therewith when the flow passages are sealed, one of said parts having ducts adapted to communicate pressure from the inlet end of the valve to the outer end of said plunger, a plate adjustably secured to the valve body on the outlet side of the partition in alinement with the slideway and providing an interior annular stop for the plunger, a follower slidable in said stop, a screw in said plate for moving said follower, and a spring between said follower and the plunger adapted to normally hold said plunger with its flow passages open.

9. In a stop valve, the combination of a body portion with an apertured partition and a slideway at the inlet side of said partition in alinement with the aperture thereof and having lateral ports, a hollow plunger in said slideway having flow passages adapted to be sealed by the partition and ports normally out of radial alinement with the slideway ports and adapted to be in the same transverse plane therewith when the flow passages are sealed, one of said parts having ducts adapted to communicate pressure from the inlet end of the valve to the outer end of said plunger, a plate adjustably secured to the valve body on the outlet side of the partition in alinement with the slideway and providing an interior annular stop for the plunger, a follower slidable in said stop, a screw in said plate for moving said follower, and a helical spring between said follower and the plunger adapted to normally hold said plunger with its flow passages open said follower and the closed end of the plunger each having an annular groove to receive the end of the spring helix and a stop at the bottom of said groove to engage the end of the wire forming the spring.

10. In a stop valve, the combination of a body portion with an apertured partition and a slideway at the inlet side of said partition in alinement with the aperture thereof and having lateral ports, a hollow plunger in said slideway having flow passages adapted to be sealed by the partition and ports normally out of radial alinement with the slideway ports and adapted to be in the same transverse plane therewith when the flow passages are sealed, one of said parts having ducts adapted to communicate pressure from the inlet end of the valve to the outer end of said plunger, a plate adjustably secured to the valve body on the outlet side of the partition in alinement with the slideway and providing an interior annular stop for the plunger forming a central socket, a cap for the outer end of the slideway providing interiorly a stop for the plunger, a handle in said cap nonrotatably and slidably engaging the plunger, and a spring between said plunger and socketed plate.

11. In a stop valve, the combination of a body portion with an apertured partition and a slideway at the inlet side of said partition in alinement with the aperture thereof and having lateral ports, a hollow plunger in said slideway having flow passages adapted to be sealed by the partition and ports normally out of radial alinement with the slideway ports and adapted to be in the same transverse plane therewith when the flow passages are sealed, one of said parts having ducts adapted to communicate pressure from the inlet end of the valve to the outer end of said plunger, coöperating stops on the slideway and plunger adapted to engage each other when the ports of the plunger are out of alinement with the ports of the slideway, and a spring between the plunger and opposite side of the valve body acting longitudinally to hold the plunger with its flow passages open and torsionally to hold said stops in engagement with each other.

12. In a stop valve, the combination of a body portion with an apertured partition and a slideway at the inlet side of said partition in alinement with the aperture thereof and having lateral ports, a hollow plunger in said slideway having flow passages adapted to be sealed by the partition and ports normally out of radial alinement with the slideway ports and adapted to be in the same transverse plane therewith when the flow passages are sealed, one of said parts having ducts adapted to communicate pressure from the inlet end of the valve to the outer end of said plunger, a stop on the plunger, spaced stops on the interior of the slideway at opposite sides of said stop on the plunger adapted to engage the same when the ports of the plunger are in alinement and out of alinement with the ports of the slideway respectively, a spring between the plunger and opposite side of the valve body acting longitudinally to hold the plunger with its flow passages open and torsionally to hold the plunger stop against the slideway stop which it engages when the ports are out of alinement, and means for turning the plunger against the power of said spring.

13. In a stop valve, the combination of a body portion with an apertured partition and a slideway at the inlet side of said partition in alinement with the aperture thereof and having lateral ports, a hollow plunger in said slideway having flow passages adapted to be sealed by the partition and ports normally out of radial alinement with the slideway ports and adapted to be in the same transverse plane therewith when the flow passages are sealed, one of said parts having ducts adapted to communicate pressure from the inlet end of the valve to the outer end of said plunger, a stop on the plunger, spaced stops on the interior of the slideway at opposite sides of said stop on the plunger adapted to engage the same when the ports of the plunger are in alinement and out of alinement with the ports of the slideway respectively, a web extending between said opposite stops on the interior of the slideway adapted to obstruct the stop on the plunger, a spring between the plunger and opposite side of the valve body acting longitudinally to hold the plunger with its flow passages open and torsionally to hold the plunger stop against the slideway stop which it engages when the ports are out of alinement, and means for turning the plunger against the power of said spring.

14. A stop valve comprising in combination a body portion having a partition between the inlet and outlet thereof, a rotatable plunger normally permitting flow past said partition and adapted to automatically shut off said flow when the fluid pressure on the outlet side diminishes with respect to the fluid pressure on the inlet side, and means for rotating said plunger to admit flow for equalizing the pressure.

15. A stop valve comprising in combination a body portion with a partition between the inlet and outlet thereof, and having ports, a rotatable plunger normally permitting flow past said partition and adapted to automatically shut off said flow when the fluid pressure on the outlet side diminishes with respect to the fluid pressure on the inlet side, and means for rotating said plunger to permit flow through said ports of the body portion until the pressure equalizes.

16. A stop valve comprising in combination a body portion having a partition between the inlet and outlet thereof, a rotatable and slidable plunger providing main and auxiliary ports, said plunger normally permitting flow through said main port past the partition and adapted to slide longitudinally and shut off said flow when the fluid pressure on the outlet side diminishes with respect to the fluid pressure on the inlet side, and means for rotating said plunger to admit a temporary flow through said auxiliary ports to equalize the pressure.

17. A stop valve comprising in combination a body portion having a partition between the inlet and outlet thereof, a rotatable and slidable plunger providing main and auxiliary ports, said plunger normally permitting flow through said main port past the partition and adapted to slide longitudinally and shut off said flow when the fluid pressure on the outlet side diminishes with respect to the fluid pressure on the inlet side, means for rotating said plunger to admit a temporary flow through said auxiliary ports to equalize the pressure, and means for returning the plunger to normal position when the pressures become equalized whereby the flow again is permitted to the main ports.

18. A stop valve comprising in combination a body portion having a partition between the inlet and outlet thereof, a member having a flow passage for admitting flow of fluid past the partition while the fluid pressure is substantially the same on both sides of the partition and stopping such flow when the fluid pressure on the outlet side diminishes with respect to the fluid pressure on the inlet side, said member having a port for conducting fluid from the inlet to the outlet sides of said partition while said flow is stopped to again equalize the pressure, and means for holding said member with the flow passage normally open and said port normally closed.

19. A stop valve comprising in combination a body portion having a partition between the inlet and outlet thereof, a plunger for admitting flow of fluid past the partition while the fluid pressure is substantially the same on both sides of the partition and stopping such flow when the fluid pressure on the outlet side diminishes with respect to the fluid pressure on the inlet side, said plunger having a port for conducting fluid from the inlet to the outlet sides of said partition while said flow is stopped to again equalize the pressure, and means for normally holding said plunger to admit said first-mentioned flow and holding said port normally closed.

20. A stop valve comprising in combination a body portion having a partition between the inlet and outlet thereof, a sliding plunger for admitting flow of fluid past the partition while the fluid pressure is substantially the same on both sides of the partition and stopping such flow when the fluid pressure on the outlet side diminishes with respect to the fluid pressure on the inlet side, said plunger being rotatable and having a port for conducting fluid from the inlet to the outlet sides of said partition while said flow is stopped to again equalize the pressure, and means for normally sliding said plunger to admit said flow and rotating said plunger to hold said port closed.

WILLIAM F. KRICHBAUM.

Witnesses:
HOWARD P. KING,
JANET A. AYERS.

Copies of this patent may be obtained for five cents each, by addressing the "Commissioner of Patents, Washington, D. C."